US005182573A

United States Patent [19]

Kim

[11] Patent Number: 5,182,573

[45] Date of Patent: Jan. 26, 1993

[54] MULTI-COLOR-THERMAL PRINTER WITH A MOVABLE PRINTER HEAD

[75] Inventor: Jong-Woo Kim, Kyounggi-do, Rep. of Korea

[73] Assignee: SamSung Electronics Co., Ltd., Suweon, Rep. of Korea

[21] Appl. No.: 582,417

[22] Filed: Sep. 14, 1990

[30] Foreign Application Priority Data

Nov. 30, 1989 [KR] Rep. of Korea ................ 17665-1989

[51] Int. Cl.[5] ........................ B41J 2/325; B41M 5/34; G01D 9/00

[52] U.S. Cl. ................................ 346/1.1; 346/76 PH; 400/120

[58] Field of Search ........................... 346/76 PH, 1.1; 400/120 ME, 662, 543, 527.1

[56] References Cited

U.S. PATENT DOCUMENTS

| | | | |
|---|---|---|---|
| 4,039,065 | 8/1977 | Seki et al. | 346/76 R |
| 4,350,987 | 9/1982 | Hanagata et al. | 346/76 PH |
| 4,654,673 | 3/1987 | Yanata et al. | 346/76 PH |
| 4,813,353 | 3/1989 | Raab et al. | 271/227 |

FOREIGN PATENT DOCUMENTS

| | | | |
|---|---|---|---|
| 006483 | 1/1980 | European Pat. Off. | 400/527.1 |
| 0011278 | 1/1984 | Japan | 400/120 |
| 0011377 | 1/1985 | Japan | 400/120 |
| 0013579 | 1/1985 | Japan | 400/656 |
| 0203085 | 11/1987 | Japan | 400/120 |

OTHER PUBLICATIONS

Cutshall et al., "Low-Cost Thermal Printer", IBM Technical Disclosure Bulletin, vol. 21 No. 1, Jun. 1978, p. 284.

*Primary Examiner*—Benjamin R. Fuller
*Assistant Examiner*—Huan Tran
*Attorney, Agent, or Firm*—Robert E. Bushnell

[57] ABSTRACT

There is disclosed a video printer having a plate-like platen, a pair of paper holders each provided on one end of the platen, a cam with a curved cam surface, a bracket with a cam follower, and a thermal printing head attached to the lower end of the bracket, the head being moved up or down and right or left by the cam follower moving along the curved cam surface.

17 Claims, 2 Drawing Sheets

MULTI-COLOR-THERMAL PRINTER WITH A MOVABLE PRINTER HEAD

BACKGROUND OF THE INVENTION

The present invention relates to a video printer that can provide a fast printing speed and occupy a small volume.

Conventionally, video printers rotate the printing paper three times while a thermal printing head sequentially sublimes three dyes of Yellow (Y), Magenta (M) and Cyan (C) laid on a three colors ribbon. The amount of the dye sublimation is controlled by the amount of the heat generation of the thermal printing head.

Such a conventional video printer, as shown in FIG. 1, comprises a platen drum 52, and a thermal printing head 51 positioned over the platen drum, wherein a color ribbon 53 having three dyes of Y, M and C and a printing paper 54 are loaded between the head 51 and the platen drum 52. The printing paper 54 is closely fixed on the platen drum 52 by a holder, rotated together with the platen drum, while the thermal printing head 51 generates heat to sequentially sublime the three dyes on the color ribbon 53, so that the sublimed dyes are absorbed on the printing paper 54. The reason why the platen drum 52 is rotated three times is to combine the three colors in the same position on the printing paper to obtain a full color printing. Namely, whenever the platen drum 52 makes a rotation, each of the three colors are sequentially printed with a slight time interval. Then, the printed paper 54 is discharged through the discharging section. Thus, because the platen drum has to be rotated three times in order to complete a printing, it takes too much time for printing Further, the printing positions of the three colors are deviate from each other,in spite of the constant rotational speed of the platen drum 52, thereby causing the deterioration of the quality of the printing image. Moreover, the diameter of the cylindrical platen drum should be large enough to wind the printing paper, so that the height of the printer sufficient to accommodate the drum makes it impossible to decrease the volume of the printer.

SUMMARY OF THE INVENTION

It is an object of the present invention to provide a video printer comprising a plate-like platen, wherein the head is caused to move for printing, whereby the volume of the printer may be considerably reduced into a slim type.

It is another object of the present invention to provide a video printer, wherein the printing paper is flatly fixed on the plate-like platen during printing operation so that it does not slip, whereby the three colors are not deviated from each other improving the image quality.

According to the present invention, a video printer comprises a plate-like platen, a pair of paper holders each provided on one end of the platen, a cam having a curved cam surface, a bracket having a cam follower, and a thermal printing head attached to the lower end of the bracket, the head being moved up/down and right/left by cam follower moving along the curved cam surface.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
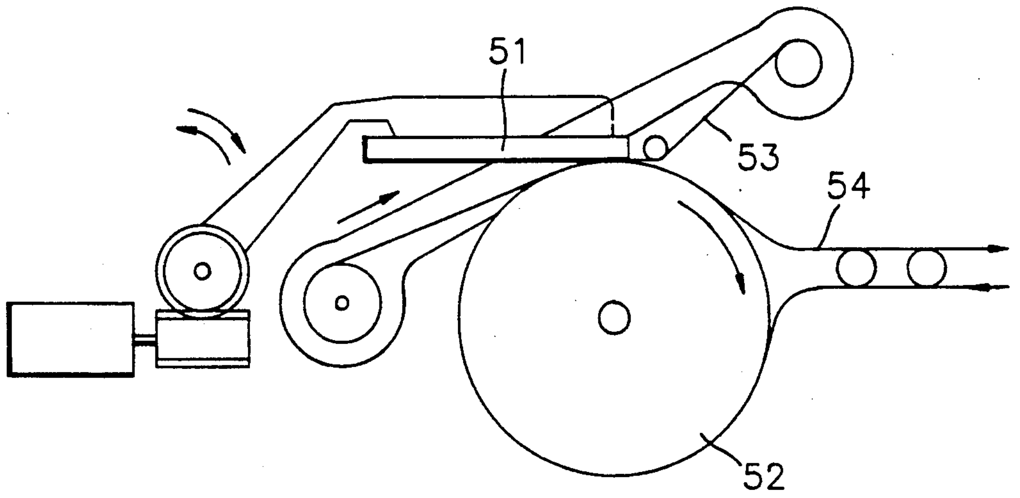
(PRIOR ART) FIG. 1
FIG. 1 is a schematic diagram of a conventional video printer.
Figure 2:
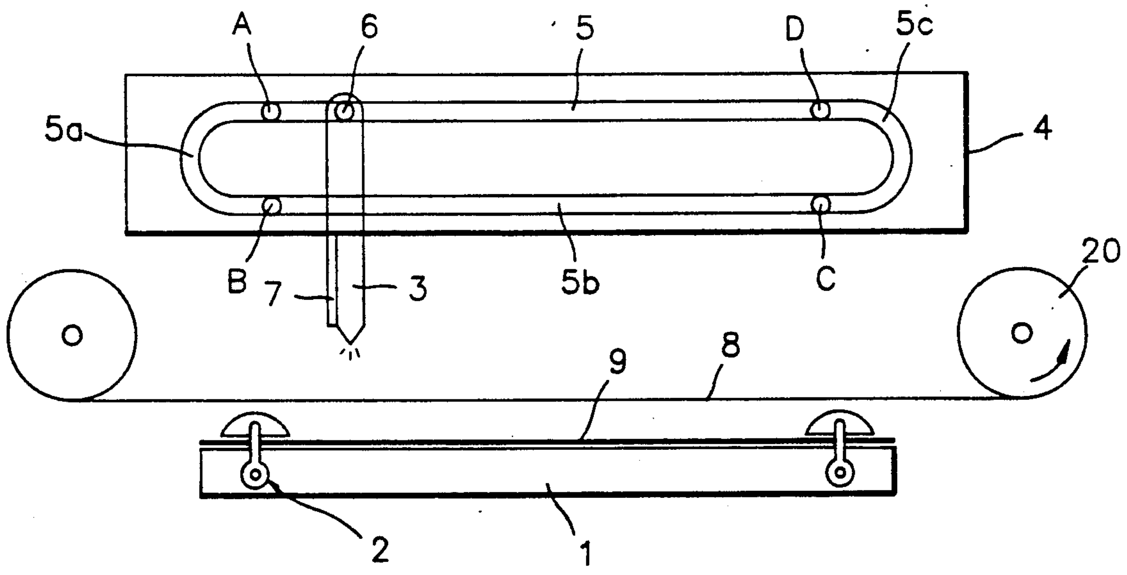
FIG. 2 is a similar view of the inventive video printer.

Referring to FIG. 2, a plate-like platen 1 has a paper holder 2 on both ends thereof. Over the platen is mounted a cam 4 with a curved cam surface 5, along which the cam follower 6 of a bracket 7 moves. The bracket 7 has a thermal printing head 3 attached to the lower end thereof. The head 3 moves up/down and right/left to make a print as the cam follower 6 moves along the curved cam surface 5. The reference numerals 8 and 9 respectively indicate a color ribbon and a printing paper.

Figure 3A:
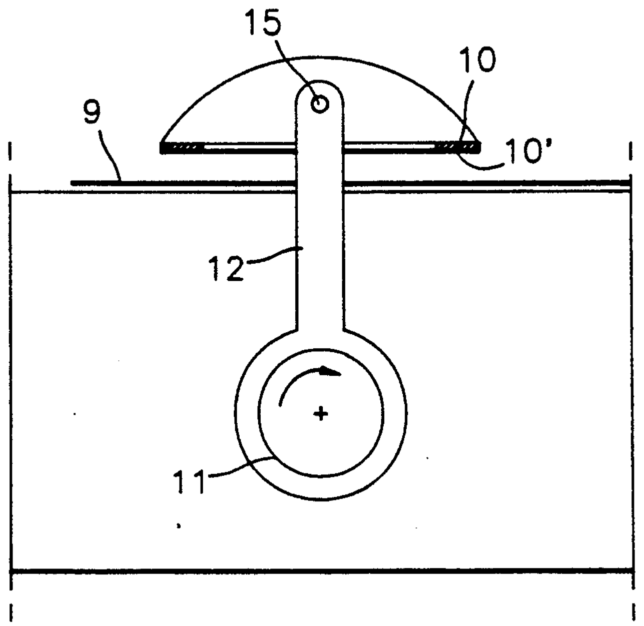
FIG. 3 is a schematic diagram for illustrating the operation of an essential part of the inventive structure.
Figure 3B:
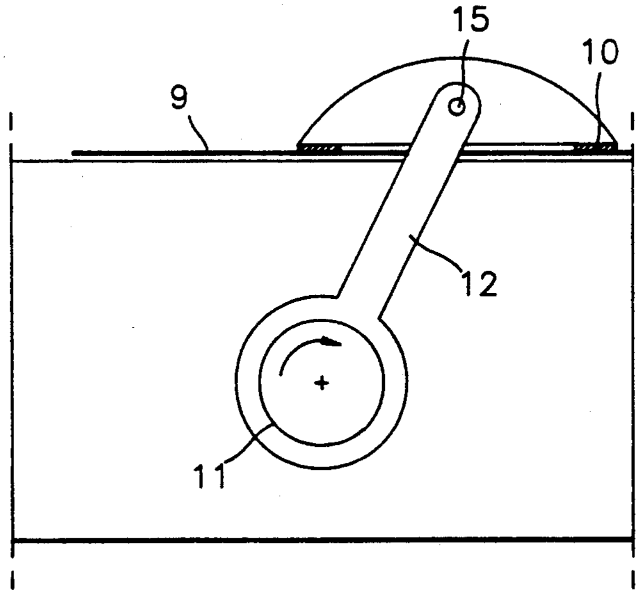

In operation of the inventive structure, if the printing paper 9 is supplied onto the upper surface of the platen, the paper holder 2 is driven by a drive mechanism (not shown) to fix the paper on the platen 1. More specifically as shown in FIG. 3A, the paper is supplied onto the platen 1 through the gap formed between the platen 1 and the pressing plate 10 of the paper holder 2 that is lifted initially. In this position, if a sensor (not shown) senses the paper supplied onto the platen 1, an arm 12 is rotated integrally with its pivot 11 to lower the pressing plate 10 to fix the paper 9 onto the platen 1. The pressing plate 10 is freely pivoted about a pivot 15, so that the underside 10′ thereof may be abutted in parallel to the platen 1 so as to stably fix the paper onto the platen (see FIG. 3B).

Thereafter, upon receiving the printing signal from the internal circuit (not shown), the thermal printing head 3 moves downwardly to press the paper 9 and the color ribbon 8 fixed on the platen 1 as the cam follower 6 of the bracket 7 moves along the curved cam surface 5*a* from the initial position A, where the thermal printing head is separated from the platen 1, to the position B. Subsequently, as the cam follower 6 moves along the cam surface 5*b*, the thermal printing head 3 moves linearly to print the Y color onto the paper until the cam follower 6 comes to the position C. If the cam follower 6 further moves to the position D, the thermal printing head 3 rises separated from the paper 9. Then, the ribbon 8 is wound around a reel 20 to replace the initial Y color part with the M color part for the paper 9.

Upon receiving the signal of the M color part of the ribbon 8 being positioned over the paper, the head is again lowered to press the ribbon 8 and the paper as the cam follower 6 moves along the cam surface 5*c* from the position D to the position C. Then, the head moves along the cam surface 5*b* from the position C to the position B with generating heat, thus uniformly printing the M color.

Upon completing the printing of the M color, the thermal printing head 3 again rises separated from the paper 9 as the cam follower 6 upwardly moves along the cam surface 5*a* to the position A. Thereafter, the color ribbon 8 is wound around the reel 20 to replace the M color part with the C color part for the paper 9. The subsequent operational steps are the same as when printing the Y color.

Thus, all three colors Y, M, C are harmoniously printed on the paper, so that one printing operation is completed. Finally, the thermal printing head linearly moves from the position D to the position A preparing for the next printing operation.

As apparent from the above description, the inventive printer comprises a plate-like platen that makes it possible to reduce the height of the printer. Moreover, the thermal printing head moves back and forth to make a printing, thus reducing the time required for printing. Further, the slip of the paper on the platen is prevented so as to provide a clear printing image.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A video printer, comprising:

a plate-like platen;

a pair of paper holders, each provided on respective ends of said platen;

a cam having a curved cam path;

a cam follower mounted in said curved cam path;

a bracket having one end attached to said cam follower; and a thermal printing head attached to another end of said bracket, said thermal printing head being moved up or down and left and right by said cam follower moving along said curved cam path and above said platen.

2. A video printer as claimed in claim 1, wherein said paper holder comprises:

an arm rotated integrally with a shaft; and a pressing plate pivotally attached to an end of said arm through a pivot.

3. In a multi-color thermal printer for printing on an imprintable medium, said printer comprising a multiple color print ribbon and a thermal print head for causing transfer of color from said ribbon to said medium, the improvement comprising:

a platen having an essentially planar first surface for supporting said imprintable medium; and means for moving said print head towards said platen and for sweeping said print head parallel to said first surface in close proximity to said first surface of said print head for desired color transfer.

4. A multi-color thermal printer, comprising:

a platen having an essentially planar first surface for supporting an imprintable medium;

a thermal print head;

a multi-color ribbon located between said print head and said platen; and means for moving said print head toward said first surface of said platen, and for moving said print head parallel to said first surface of said platen.

5. A multi-color thermal printer according to claim 4, said moving means comprising:

means for sweeping said print head parallel to said first surface in close proximity to said first surface.

6. A multi-color thermal printer according to claim 5, said moving means further comprising:

means for returning said print head parallel to said first surface at a distance from said first surface.

7. A multi-color thermal printer according to claim 4, said moving means comprising:

cam means facing said first surface and having a curved cam path; and a bracket attached to a cam follower for following said cam path, and having said thermal printing head attached to one end of said bracket.

8. A multi-color thermal printer according to claim 7, further comprising:

means for cycling said cam follower along said cam path, to drive said print head relative to said first surface.

9. A multi-color thermal printer according to claim 4, further comprising:

medium holding means for securing said imprintable medium to said first surface in a stationary manner.

10. A multi-color thermal printer according to claim 9, said holding means comprising:

a pressing plate separable from said first surface for allowing said medium to pass between said pressing plate and said first surface; and means for moving said pressing plate toward said first surface to clamp said medium between said pressing plate and said first surface.

11. A multi-color thermal printer according to claim 10, said holding means comprising:

an arm pivotally attached at a first end to said platen and pivotally attached at a second end to said pressing plate, said arm rotatable in a plane normal to said first surface to drive said pressing plate in a direction toward said first surface.

12. A multi-color video printer, comprising:

a platen having a planar first surface for supporting an imprintable medium;

means pivotally coupled to said platen, for pivotally engaging and holding the imprintable medium at a plurality of locations, against said first surface;

a print head;

means located above said first surface, for guiding said print head through a continuous path extending across and spaced-apart from said platen while enabling longitudinal displacement of said print head toward and away from said platen and while said holding means maintains the imprintable medium stationary against said first surface; and means for coupling said print head to said guiding means.

13. The multi-color printer of claim 12, wherein the holding means comprises:

an arm having a first end of said arm pivotally attached to said platen; and a pressing plate having a planar second surface, wherein the second surface is facing downward and the pressing plate is pivotally attached to a second end of said arm.

14. The multi-color thermal printer of claim 13, wherein said holding means comprises:

a plurality of arms each having a first end pivotally attached to different locations along said platen; and a corresponding plurality of pressing plates each pivotally attached to a second end of said arm and each having a planar second surface facing said planar first surface.

15. The multi-color thermal printer of claim 14, further comprising a multi-color print ribbon located between said thermal print head and said platen.

16. A process for multi-color thermal printing, comprising:

loading an imprintable medium onto a planar first surface of a platen;

holding the imprintable medium fixedly in place with a pivotally operated pressing plate;

pressing a multi-color print ribbon against the imprintable medium with a thermal printing head;

moving said thermal printing head in a direction parallel to the first surface of the platen and along the print ribbon; and raising the thermal printing head off of the print ribbon.

17. The process of claim 16, further comprising:

replacing a first color part of the print ribbon with a second color part of the print ribbon;

pressing the multi-color ribbon against the imprintable medium with the thermal printing head;

moving said thermal printing head in a direction parallel to the first surface of the platen and along the print ribbon; and raising the thermal printing head away from the print ribbon.

* * * * *

UNITED STATES PATENT AND TRADEMARK OFFICE
CERTIFICATE OF CORRECTION

PATENT NO. : 5,182,573

DATED : 26 January 1993

INVENTOR(S) : Jong-Woo KIM

It is certified that error appears in the above-indentified patent and that said Letters Patent is hereby corrected as shown below:

Column 1, line 35, after "printing", insert a period-- . --;

line 38, after "causing", delete "the";

Signed and Sealed this

Fifteenth Day of October, 1996

Attest:

Bruce Lehman

BRUCE LEHMAN

*Attesting Officer* *Commissioner of Patents and Trademarks*